United States Patent [19]

Nordhaus

[11] Patent Number: 4,858,244
[45] Date of Patent: Aug. 15, 1989

[54] MECHANICALLY ACTUATED LASER INITIATOR

[75] Inventor: John P. Nordhaus, Northbrook, Ill.

[73] Assignee: Scot, Incorporated, Downers Grove, Ill.

[21] Appl. No.: 173,116

[22] Filed: Mar. 24, 1988

[51] Int. Cl.$^4$ ............................................. H01S 3/091
[52] U.S. Cl. .......................................... 372/77; 372/65; 372/6
[58] Field of Search ................... 372/77, 65, 61, 6, 69, 372/72, 55

[56] References Cited

U.S. PATENT DOCUMENTS 4,641,314  2/1987  Koseki .................................. 372/65
4,646,336  2/1987  Koseki .................................. 372/65

OTHER PUBLICATIONS

Laser Initiation of Explosive Devices, by L. C. Yang, V. J. Menichelli and J. E. Earnest, Jan.-Feb. 1974 issue of National Defense Magazine, pp. 344–347.

Primary Examiner—Leon Scott, Jr.
Attorney, Agent, or Firm—Mann, McWilliams, Zummer & Sweeney

[57] ABSTRACT

A laser type initiator device for activating air crew emergency escape systems and the like comprising a housing having a generally cylindrical chamber and defining a trough opening at one end of same, with the chamber and opening being coaxially oriented, a laser rod extending centrally of the chamber and frictionally retained in the housing through opening and equipped for optical pumping for directing a laser beam through the housing through opening, as into a fiber optic cable that is releasably secured to the housing in alignment with the trough opening, a flash bulb assembly received about the laser rod including a pyrex glass tube that receives and protects the laser rod and a plurality of percussion type flash bulbs received about the tube, which flash bulbs are disposed to have their primed ends all positioned crosswise of a common plane that is transverse of the axis of the laser rod, a striker assembly mounted adjacent the primed ends of the flash bulbs and having for each of the flash bulb primed ends a separate resilient swing arm that acts in the indicated transverse plane for resiliently striking the respective flash bulb primed ends to ignite the flash bulbs, an actuator assembly received over the stroker assembly and mounted for movement axially of the laser rod and including a camming arrangement for stroking the respective swing arms to resiliently stress same rotationally of the laser rod axis in one direction of movement of the actuator assembly, and an actuator assembly movement inducing device for effecting a rotatably connected purchase on the actuator assembly for moving to in effect cock the respective swing arms for striking of the respective flash bulbs on release of the actuator assembly movement inducer.

14 Claims, 4 Drawing Sheets

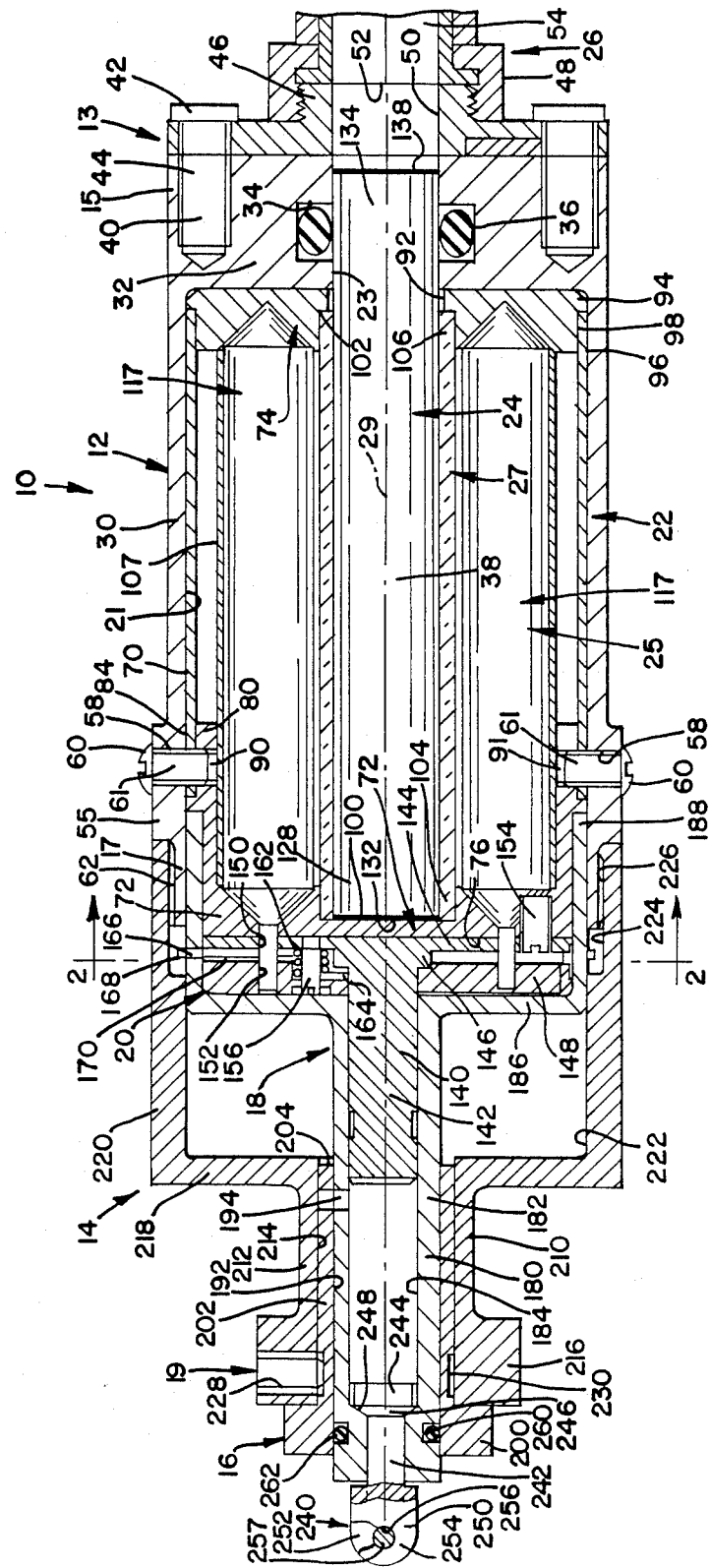

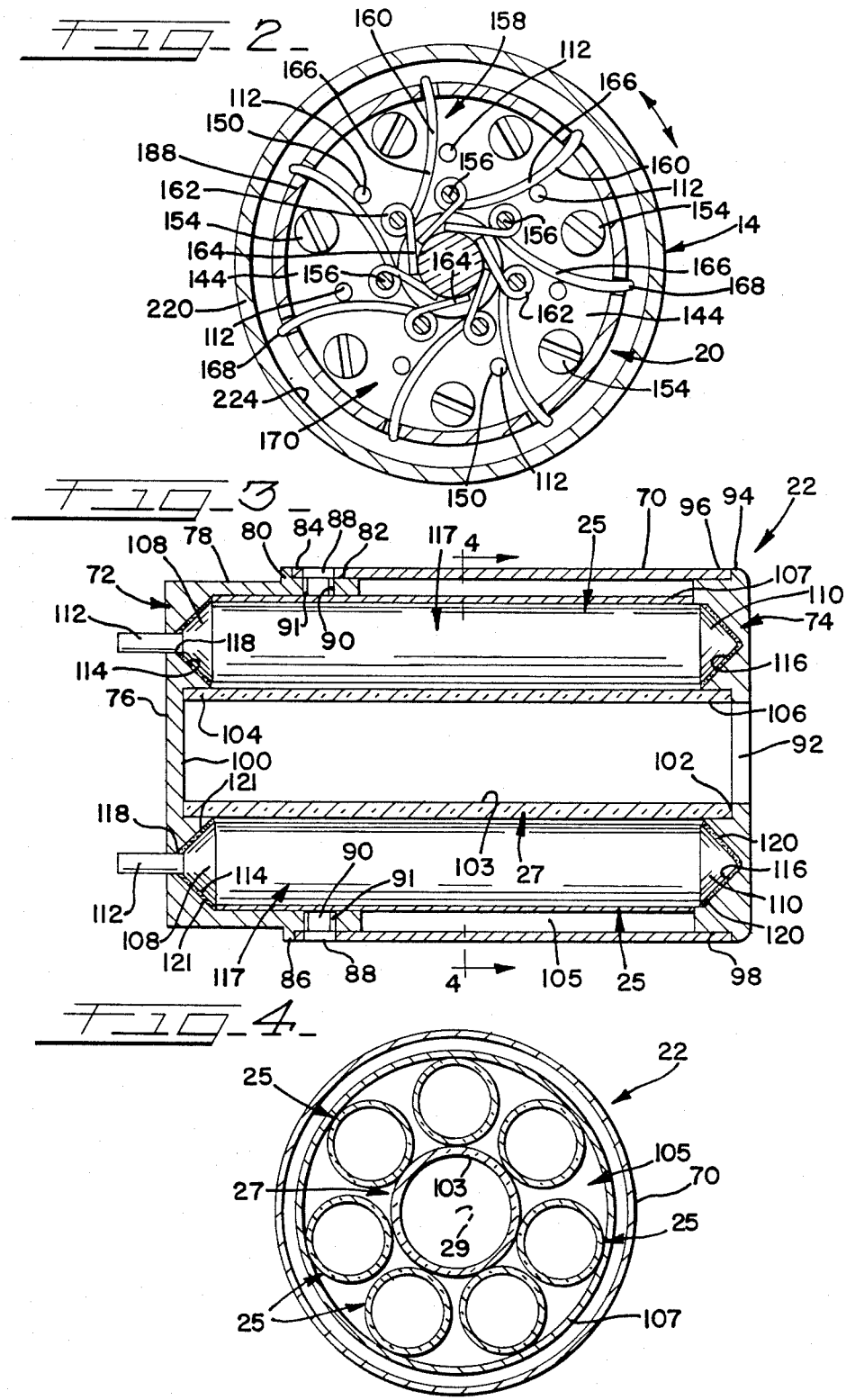

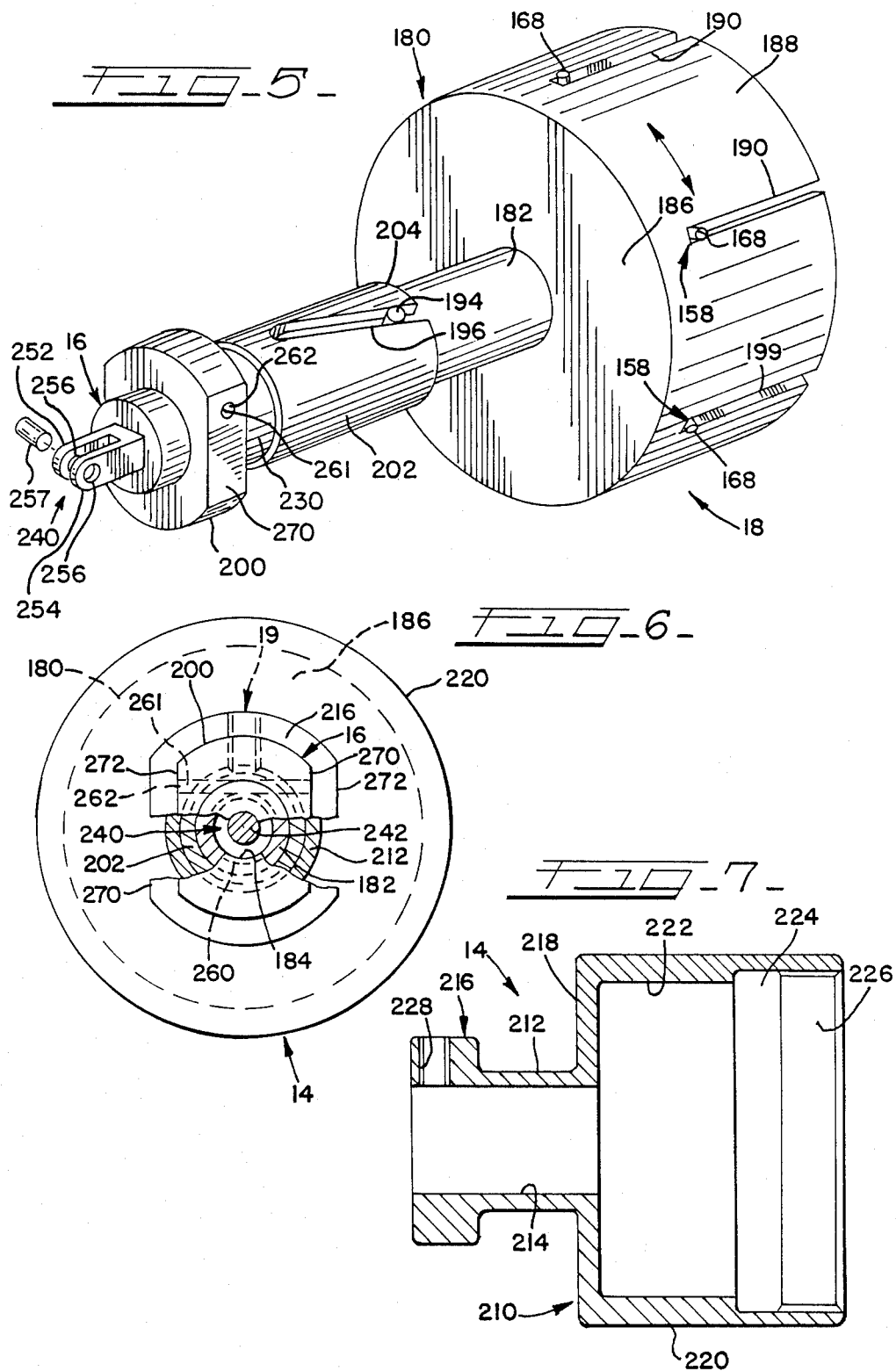

MECHANICALLY ACTUATED LASER INITIATOR

This invention relates to laser type initiator devices for activating emergency equipment such as air crew escape systems abroad aircraft, space craft, and/or launch vehicles, and more particularly, to a laser type initiator device that is arranged for mechanical action to ignite without fragmenting the flash bulbs of a flash bulb assembly that provides the light energy to the laser rod from which the laser beam is generated by optical pumping for providing the signal that actuates the emergency equipment.

Laser type initiators for initiating emergency equipment abroad aircraft, space craft, and/or launch vehicles have been recognized as having significant advantages over, for instance, electro-explosive devices (known in the art as EED's) because of increased safety, simplicity of design and operation, increased weight efficient and elimination of the need for a source of electricity. However, initiator devices of the laser type heretofore have been primarily devised to scientifically prove the viability of laser type initiators, with the result that commercially practical arrangements of this type of initiator have, generally speaking, awaited further developing.

The present invention is concerned with providing the specifics of a laser type initiator device that can be readily applied to, for instance, vehicles of the type indicated, and in emergency equipment activation systems thereof, which permits a laser beam to be generated for transmittal via conventional fiber optic cable arrangements to either a single piece of equipment to be actuated, or, by employing conventional fiber optic cable branching equipment, to a number of such pieces of equipment to be actuated.

A principal object of the present invention is to provide a basic laser type initiator or initiation device arranged to include a laser rod and associated flash bulb assembly that provides for the optical pumping that generates the laser beam signal that is desired for transmittal to the emergency equipment to be actuated, with the flash bulbs all being of the percussion type and the initiation device itself being arranged to mechanically effect simultaneous ignition of the flash bulb assembly flash bulbs when, for instance, the aircraft pilot or other designated personnel aboard the aircraft have been apprised of an emergency situation and such individual effects operation of the initiator device for activation of one or more pieces of emergency equipment aboard the aircraft, and with the initiator device being capable of being releasably keyed in its inoperative relation until its operation is needed.

Another principal object of the invention is to provide a laser type initiator for activating emergency equipment of the type indicated, that is of practical and reproducible design, and may be employed as the initiator for actuation of a wide variety of equipment, using a laser beam signal that is transmitted to conventional fiber optic cabling that leads to the locale of the equipment to be actuated.

Still another principal object of the invention is to provide a laser type initiator for activating emergency equipment that is reusable after it has been employed to provide an equipment activating laser beam signal, by providing for protection of the initiator device laser rod as mounted in the initiator device and arranging the initiator device so that its flash bulb assembly when used for initiation purposes can be replaced by a fresh flash bulb assembly containing fresh unignited flash bulbs.

Other objects of the invention are to provide a laser type initiator device for activating emergency equipment that is economical of manufacture, reliable and long lived in use, and when once used, can be made reusable without requiring a new laser rod by protecting the laser rod from damage due to the igniting of the flash bulbs, and by arranging the device so that a fresh flash bulb assembly may be applied thereto for reuse of the initiator with the same facility as was obtained in the initial use of same.

Other objects, uses, and advantages will be obvious or become apparent from a consideration of the following detailed description and the application drawings.

In the drawings:

FIG. 1 is a diagrammatic longitudinal sectional view through a laser type initiator device arranged in accordance with the present invention, showing also a conventional fiber optic cable removably secured to the apertured end of the device from which the laser beam is to be directed (the right hand end of the embodiment illustrated);

FIG. 2 is a transverse cross-sectional view approximately along line 2—2 of FIG. 1 illustrating important features of the initiator device flash bulb striker assembly;

FIG. 3 is a longitudinal sectional view of the flash bulb assembly that is shown in FIG. 1, with the flash bulb assembly of FIG. 3 being illustrated as a separate subcombination;

FIG. 4 is a transverse cross-sectional view of the flash bulb subassembly taken substantially along line 4—4 of FIG. 3;

FIG. 5 is a diagrammatic perspective view of the initiator device actuator assembly and cooperating collar that in the illustrated embodiment is adjustably mounted (rotationally) in the device and keyed thereto in a position that lightly tensions the initiator striker assembly;

FIG. 6 is a left hand end view of the actuator assembly and associated collar of FIG. 5 illustrating the manner in which the actuator assembly is releasably keyed relative to the device housing to hold the initiator device in its inoperative relation until needed;

FIG. 7 is a longitudinal sectional view through the initiator device header or cap that is illustrated in FIG. 1, and to which the device collar is keyed for lightly tensioning the striker assembly of the device;

Figure 8:
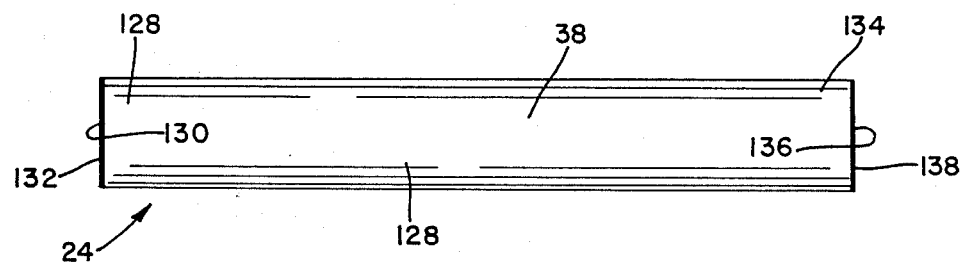
FIG. 8 is a side elevational view of the laser rod of the initiator device.

However, it is to be distinctly understood that the specific drawing illustrations provided are supplied primarily to comply with the requirements of the Patent Laws, and that the invention is susceptible of other embodiments and modifications that will be readily apparent to those skilled in the art, and which are intended to be covered by the appended claims.

GENERAL DESCRIPTION

Reference numeral 10 of FIG. 1 generally indicates a preferred embodiment of the invention, in which the initiator 10 is shown as it would appear when assembled and ready for shipment to customers.

As is well known in this art, initiator devices are widely used to activate emergency equipment involved in air crew escape systems carried aboard aircraft, space craft, launch vehicles, and the like. Many forms of emergency equipment are designed for actuation by a signal that originates at what is known as an initiator device that is also part of the equipment aboard the vehicle involved. The initiator is normally located adjacent the station or seat of the pilot or designated crewman and is readily available for actuation, when emergency conditions are encountered. However, initiator devices of the type illustrated can be employed to activate a wide variety of equipment in installations where emergency conditions are not part of the design criteria involved.

As is also well known, a number of different types of initiators are available, and as installed, they provide a means for essentially instantaneous actuation of emergency equipment, some forms being explosively equipped for this purpose. In the recent past, consideration has bee given to adapting laser technology for this purpose, and experimental laser units have been successfully tested. The general purpose of this invention is to provide a laser type initiator arranged to provide the light energy and optical pumping needed to generate essentially instantaneously a laser beam that can be transmitted through conventional optical cabling, including branch cabling, to the equipment to be actuated using the reliable laser beam signal for this purpose and commercially available fiber optic cabling leading from the initiator to the equipment to be actuated, even though the fiber optic cabling to any particular piece of emergency equipment is mounted or installed so as to define a circuituous laser beam path that involves angled bends and the like.

Referring now more particularly to FIG. 1, the initiator 10 of this invention comprises housing 12 provided with removable end plate 13 at one end 15 of same and a header or cap 14 threadedly secured to the open end 17 of housing 12, a collar member 16 that normally is keyed to the housing header or cap 14 by appropriate set screw 19, and an actuator assembly 18 that operates within the initiator header or cap 14 to actuate a striker assembly 20.

The housing 12 defines internal chamber 21 in which is received, in accordance with the present invention, a flash bulb assembly 22 that is coaxially related to housing through opening or aperture 23 in which laser rod 24 is frictionally retained, in accordance with the illustrated embodiment.

The flash bulb assembly 22 includes a plurality of elongate flash bulbs 25 of the percussion type and a high temperature resisting transparent tube 27 that is received over the laser rod 24 in protective relation thereto longitudinally of the flash bulbs 25.

In accordance with the present invention, when the initiator 10 is to be employed to activate equipment, such as the emergency escape equipment of aircraft or the like, the actuator assembly 18 is to be shifted longitudinally of the longitudinal axis 29 of the chamber 21 and laser rod 24 to condition the striker assembly 20 for simultaneously igniting each of the flash bulbs 25 at their left hand ends (in the showing of FIG. 1), the ignition of which and burning of same to the right of FIG. 1 effects a light energy generation and transmittal through the tube 27 into the laser rod 24 approximately three hundred sixty degrees thereabout, and consequent optical pumping within the laser rod 24 that generates the laser beam that emanates from the device 10 through the housing through opening or aperture 23 and into, for instance, conventional fiber optic cabling 26 that is removably secured to housing end plate 13 and leads to the equipment to be activated by the laser beam signal involved. The fiber optic cabling may be branched in any conventional manner for sending laser beam signals to a number of different types of equipment to be activated and located at different positions within the vehicle or the like to which the initiator device 10 is applied.

SPECIFIC DESCRIPTION

The housing 12 may be formed from a suitable light weight material, such as aluminum, and in the form shown defines the annular side wall 30 and end wall 32 that in turn define the chamber 21. The wall 32 is at the end 15 of the housing 12, and is formed to define the through opening or aperture 23 as well as suitable annular recess 34 in which is lodged, in the illustrated embodiment, a suitable O ring seal 36 that is of the usual annulus form and is proportioned to resiliently grip the external side surfacing 38 of the laser rod 24 to frictionally hold the laser rod 24 against displacement from its operating position shown in FIG. 1.

The housing end plate 13 is suitably affixed to the housing 12 by employing a plurality of suitable bolts or screws 40 having the usual heads 42 and threaded stems 44 for the purpose of holding end plate 13 flush against the end wall 32 of housing 12. End plate 13 is formed to define an externally threaded stud 46 that threadedly receives conventional fitting 48 for removably securing, for instance, the illustrated conventional fiber optic cabling 26 to housing 12. End plate 13 defines centrally located aperture or opening 50 that is aligned with the housing through opening or aperture 23, to permit transmission of the laser beam generated by device 10 into the end 52 of the fiber optic member 54 that comprises the internal laser beam transmitting portion of the cabling 26; transmission of the laser beam may also be directed immediately to conventional pyro or other ballistic charges for initiation purposes, as those skilled in the art will appreciate.

The end 17 of the housing 12 receives a flash bulb assembly 22 that is circumferentially proportioned to be centered within the chamber 21 in coaxial relation with the chamber 21 and laser rod 24 in the assembled relation of the device 10. Housing 12 defines an external annular shoulder 55 that is apertured as at 58 at spaced locations about its periphery to receive the respective screws 60 that secure the flash bulb assembly in its operative relation, as will be described hereinafter. The end 17 of the housing 12 is externally threaded as at 62 to threadedly mount the housing header or cap 14 on same in the position shown in FIG. 1, as will also be described hereinafter.

The flash bulb assembly 22 is diagrammatically illustrated in FIGS. 3 and 4, and comprises an outer side wall forming sleeve 70, a header or cap 72, and a base 74. The header or cap 72 and the base 74 are preferably formed from a suitable phenolic resin material. The header or cap 72 defines planar or flat top surface 76, cylindrical side surface 78, and cylindrical annular rib 80 which is recessed as at 82 to receive the end 84 of the sleeve 70 in close fit relation thereto. The rib 80 thus defines annular shoulder 86 against which the sleeve end 84 abuts in the assembled relation of assembly 22. The sleeve end 84 and the header rib 80 are formed with an equal number of openings or apertures 88 and 90, all located for alignment with the housing apertures 58, respectively to receive the respective screws 60 (see FIG. 1), with the openings 90 being suitably threaded (as at 91) for threadedly receiving the stems 61 of the respective screw 60 whereby the header or cap 72 of the subassembly 22 is secured to the sleeve 70.

The base 74 suitable generally annular in configuration to define central through opening or aperture 92 that is also formed to define shoulder 94 against which the end 96 of the sleeve 70 abuts in the assembled relation of assembly 22. For this purpose the base 74 is formed to define cylindrical land 98 that is proportioned for close fitting relation within the sleeve 70.

The assembly 22 also includes transparent tube 27 that is to be received over the laser rod 24 (see FIG. 1), with the header or cap 72 and the base 74 being respectively recessed as at 100 and 102 to receive the ends 104 and 106 of the tube 27 in close fitting relation thereto in the assembled relation of the assembly 22.

In addition, the assembly 22 is equipped with a plurality of the indicated flash bulbs 25 that are of the percussion actuated type. The flash bulbs 25 may be of any suitable conventional percussion actuated type, such as those offered commercially by General Electric Company of Cleveland, Ohio or Sylvania of Danvers, Mass. (they are readily available from any store facility handling photo equipment). Flash bulbs 25 each comprise an expendable, high intensity light source of flash duration, and comprise hermetically sealed glass bulbs filled with crumpled thin sheets or finely shredded wire filaments of such metals as aluminum, magnesium, zirconium, or hafnium in an atmosphere of oxygen. The firing ends 108 and the base ends 110 of the flash bulbs 26 conventionally are basically cone shaped in configuration, with the firing ends 108 terminating in an elongate stem 112 that contains the primer charge for igniting the flash bulb by impacting the stems 112 from one side thereof.

The present invention contemplates that the flash tube assembly 22 will hold the flash bulbs 25 it contains in substantially parallel relation to the centrally located tube 27, and for this purpose, the header or cap 72 and the base 74 are formed with conically configured indentations 114 and 116 that, for each flash bulb 25, should be aligned longitudinally of the assembly 22, to define a subchamber 117 that appropriately receive the respective flash bulbs 25, with the header or cap 72 being formed with a plurality of through apertures or openings 118 that are equal in number to the number of flash bulbs the assembly 22 is contained, to receive and pass the respective flash bulb stems 112, as indicated in FIG. 3.

The tube 27 preferably takes the form of pyrex glass or other suitable high temperature transparent material having its bore 103 proportioned for close fitting relation with the laser rod 24 and having its length proportioned for reception of its ends 104 and 106 within the respective recesses 100 and 102 of the header 72 and base 74, respectively, such that the header 72 and base 74 can be applied to the side sleeve 70 with the relationship shown in FIGS. 1 and 3, and with bulbs 25 received in their respective subchambers 117, of annular flash bulb chamber 105.

The flash bulb assembly 22 is assembled for application to a chamber 21 of a housing 12 by taking a base 74 and applying it to a side sleeve 70 in the manner indicated in FIG. 3, after which a tube 27 and the indicated plurality of flash bulbs 25 may be applied within the annular chamber 105 defined by same. It is preferable that the tube 27 be first applied to the base 74 and adhered thereto by application of a suitable epoxy resin where indicated at 120, and in an annular manner about the inner margin of the recess 102, with care being taken to be sure that the tube 27 extends coaxially of base 74 within sleeve 70.

In applying the flash bulbs 25 to chamber 105, individual flash bulbs 25 of a suitable number (seven in the illustrated embodiment, see FIG. 4), are then grouped together within a suitable foil wrapping 107 in the annular manner indicated in FIG. 4, and slipped into the chamber 105 about the upstanding tube 27, after which the header 72 is applied to the flash bulbs 25, the tube 27, and the side wall 70 in the manner indicated in FIG. 3, with it being preferable that the epoxy resin be applied where indicated at 121 in an annular manner between the end 104 of the tube 27 and the rim of recess 100 to bond the header or cap 72 to the tube 27 with the positioning indicated in FIGS. 1 and 3, for reception of the securement screws 61 (after the assembly 22 is applied to the chamber 21, as described hereinafter). This disposes the flash bulb striking stems 112 exteriorly of the assembly 22 and extending through a plane that parallels the end surface 76 of the assembly header or cap 72, which, of course, extends transversely of the housing 12 as the assembly 22 is to be applied to its chamber 21.

The laser rod 24 (see FIG. 8) is a cylindrical member defining cylindrical side wall 38 having surfacing 126 and is formed from neodymium-glass (3 per cent $Nd_2O_3$ Nd-glass), with the rod in question per se being commercially available from Schott Optical Glass Inc. of Duryea, Pa. The side cylindrical surfacing 126 of the rod should be smooth and, of course, it is proportioned for close fitting relation within tube 27, as indicated in FIG. 1, and for frictional retention within the housing 12, as by employing O ring 36 or a similarly resiliently flexible deformable sleeve or other device for frictionally gripping the rod side wall 38 when the rod is applied to the housing 12 with the positioning indicated in FIG. 1. Rod 24 at its end 128 defines transverse end surface 130 that is suitably mirrored thereacross as indicated at 132 to be 100 per cent light reflective longitudinally of the rod 24, while at its end 134 transverse end surface 136 is defined which is suitably mirrored to be approximately 90 per cent reflective, longitudinally of rod 24, as per standard laser rod optical pumping techniques. The mirrored end portions 132 and 138 of the laser rod 24, together with the nature of the laser rod 126 itself, insure the optical pumping to be provided by the laser rod 24 on ignition of the flash bulbs 25, to generate the laser beam to be emitted by the device 10.

As indicated in FIG. 1, the laser rod 24 is applied to the housing 12 so that its mirrored end 132 substantially abuts, or is closely adjacent, the flash bulb assembly header 72 when the flash bulb assembly 22 is applied to housing 12.

The striker assembly 20 generally comprises guide member 140 defining a guide rod portion or section 142 (see FIG. 1) that is integral with a cross flange 144 that is to seat on the end surface 76 of the flash bulb assembly header or end cap 72, as indicated in FIG. 1. Guide member 140 includes an external shoulder 146 on which seats the striker assembly cover member 148, as indicated in FIG. 1. Both the flange 144 and cover member 148 are formed with the respective apertures 150 and 152 that are equal in number to the number of flash bulbs 25 employed, and that are aligned to receive the respective flash bulb stems 112.

As indicated in FIGS. 1 and 2, the guide member flange 144 is affixed to the flash bulb assembly header 72 by a plurality of headed screws 154. The cover member 148 in turn is affixed to the flange 144 by a plurality of headed screws 156 each of which also acts as a pivot for the respective striker assembly swing arms 158 that are equal in number to the number of flash bulbs 25 in assembly 22, and that are to function individually to ignite one of the flash bulbs 25 by impacting against one side of the flash bulb stem 112, in a simultaneous or synchronized manner.

The swing arms 158 each comprise equal lengths 160 of a suitable spring wire that may have a thickness lying in the range of from about 0.15 to about 0.30 inches with a wire diameter of 0.02" being preferred. Each length of wire 160 is formed to define a coil portion 162 that receives the respective screws 156 (see FIG. 2), an inner or tail end portion 164 that is intended to bear against the guide member guide portion 142 (compare FIGS. 1 and 2), and a striking arm or section 166 having a terminal end portion 168.

It is to be noted that the swing arm outwardly directed end portions 168 are operably associated with the actuator assembly 18 in a camming relation thereto that will be described hereinafter, and that the swing arm sections 166 of the swing arms 158 are operative in the annular planar space 170 that separates the guide member flange 144 from the cover 148 (see FIG. 1). The striking sections 166 of the respective swing arm 158 thus operate in the same plane that the stems 112 of the respective flash bulbs 25 extend through.

Operably associated with the striker assembly 20 is the actuator assembly 18 that comprises, in the form of FIGS. 1-8, a casting or a machined member formed from aluminum or the like to define an actuator member 180 having a tubular spindle or stem portion or section 182 defining a bore 184 (see FIG. 1) proportioned internally for close fitting relation over the spindle portion 142 of guide member 140 as indicated in FIG. 1; the actuator spindle portion 182 is integral with a laterally extending flange portion 186 that covers the striker assembly cover 148 and is in turn integral with annular skirt 188 that is received over striker assembly 20, and receives, in close fitting relation thereto, the header or cap 72 of the flash member assembly 22, and in close fitting relation to its cylindrical side wall 78. In the form of the initiator shown in FIGS. 1-8, the actuator member skirt 188 is formed with a plurality of longitudinally extending through slots 190 (see FIG. 5), each of which is operably associated with one of the swing arms 158 to slidably receive the end portion 168 thereof (see FIG. 2) for purposes of stroking the respective spring arms 158 in one direction about the longitudinal axial center 29 of the initiator 10 to resiliently stress same so that when the actuator assembly is freed from movement restraint, the swing arms 158 will swing in the opposite direction to individually impact the flash bulb stems 112 in a simultaneous manner for percussion ignition of the flash bulbs, that in accordance with the present invention, initiates the optical pulsing of the laser rod 24 to generate the laser beam that is to be supplied by the initiator 10.

The actuator spindle portion or section 182 is received in close fitting relation within the bore 192 of the collar member 16. The actuator member 180 at its tubular spindle portion 182 has suitably fixed thereto a cam pin 194 (see FIG. 5) that rides in close fitting relation to and within a slot 196 formed in the collar 16, and in this connection, it is to be noted that the slot 196 is rectilinear in configuration, and is at an angle relative to the longitudinal axis center line 29 of the initiator 10, as distinguished from being parallel thereto.

As indicated in FIGS. 1 and 5, the collar 16 includes a head portion 200 and a sleeve portion 202 in which the slot 196 is formed. In the illustrated embodiment, the slot is of rectilinear or straight line configuration, but extends from the end 204 of the collar sleeve portion 202 in the direction of the collar head 200 through an angle of approximately 35 degrees about the circumference of the collar sleeve portion 202, but this angulation is not considered critical as such. The extent of angulation and the length of the slot 196 basically may be such that will adequately stress the swing arms in a wind up like action so that when the actuator assembly 18 is free from movement restraint, the individual swing arms 158 will strike the individual flash bulb stems 112 with sufficient force to ignite the respective flash bulbs 25.

As indicated in FIG. 1, the collar 16 is received in, and in close fitting relation to, the housing header or end cap 14, the latter comprising cover member 210 defining a tubular stud portion 212 having a bore 214 in which the collar sleeve portion 202 is received in close fitting relation thereto (as indicated in FIG. 1), with the stud portion 212 being integral with a flanged head 216 against which the head 200 of the collar 16 seats; the housing header or cap stud portion 212 is integral with laterally extending circular flange 218 (see FIGS. 1 and 7) that is in turn integral with a skirt 220 (see FIG. 7) that has an internal stepped diameter configuration forming an inner chamber 222 that is in close fit sliding relation with the skirt 188 of the actuator, assembly actuator member 182, an intermediate annular recess 224 toward which the projecting end portions 168 of the swing arm 158 are directed, and internally threaded annular section 226 that is threadedly applied to the corresponding external threading of the housing 12 at its end 17 to form the indicated threaded connection at housing threading 62, and against housing shoulder 55.

The head 216 of the housing header or cap 14 is formed with internally threaded aperture or opening 228 extending transversely of same for threaded reception of the suitable set screw 19 in same that is to be applied to an annular groove 230 formed on the external side of the collar sleeve portion 202 to fix the position of the collar 16 relative to the housing 12, as disclosed hereinafter, so as to preload swing arms 158.

The actuator assembly 18 further comprises the spindle section 182 having applied thereto, in the illustrated embodiments, a clevis assembly 240 that includes a shaft section 242 formed with a headed inner end 244 (see FIG. 1) that in the form shown is formed with annular conical surfacing 246 that cooperates with corresponding annular surfacing 248 of the actuator member 180 to permit the actuator member 180 to have rotational movement relative to the clevis assembly 40. The shaft section 242 is integral with clevis element 250 defining the usual pair of upstanding spaced apart flanges 252 and 254 each having aligned cross apertures 256 for removably receiving a suitable cross or transverse pin 257 (shown in section in FIG. 1) that is to key an appropriate and conventional pull handle or the like (not shown) to the clevis assembly 240 (as will be clear to those skilled in the art).

As indicated in FIGS. 1 and 6, the sleeve section 182 of actuator member 180 is formed with annular groove 260, and the head 200 of collar 16 is apertured crosswise thereof, as at 261, and in alignment with a portion of the groove 260, to receive the safety pin or key 262 (see FIG. 1) that holds the initiator 10 in inoperative relation until actuation of same is desired. The safety pin or key 262 may be removed on installation of the initiator 10, or it may be left in place until the vehicle in which the initiator is applied is to be rendered operative, with the pin 262 being reapplied after, for instance, a flight of an aircraft to which the initiator 10 is applied has terminated.

Assuming for purposes of assembly of initiator 10 that a laser rod 24 and flash bulb assembly 22 have been applied to housing 12 in the manner already indicated, the flash bulb assembly 22 has the striker assembly 20 and the actuator assembly 18 applied thereto in the manner indicated in FIG. 1; the ends 168 of the respective swing arms are respectively applied to the individual slot 190 of the actuator skirt 188 (see FIGS. 2 and 5) as part of the assembly of the stroker assembly 20 and actuator assembly 18. And, of course, the actuator assembly 18 is equipped with clevis assembly 240. The housing header or end cap 14 and collar 16 are separately assembled together and then applied to the actuator assembly 18 and housing 12 in the manner indicated in FIG. 1, with the internally threaded section 226 of the header or end cap 14 being in threaded relation with suitable external threading 62 applied to the end 17 of the housing 12 to threadedly connect the header or end cap 112 to housing 12 in seated relation with the housing external rim represented by shoulder 55. It will be noted that in this relation of parts the laterally projecting end portions 168 of the respective swing arms 158 are directed to and in the plane of recess 224 of the header or end cap 14, and in the unwound or unstressed relation of the initiator, end portions 168 are to be well spaced from the skirt 220 of the header or end cap 14.

As part of the assembly procedure, the swing arms 158 are preferably prestressed a predetermined amount by applying the keying pin 262 in the indicated position shown in FIGS. 1 and 6, between the collar head 200 and the actuator assembly spindle 182, and turning the collar 16 in the appropriate direction relative to the housing 12 and its header 14 (counter clockwise in the forms illustrated), after which the set screw 19 is set to lock the housing header or end cap 14 to collar 16 in the desired position of preloading of swing arm 16. Both the heads 200 and 216 have the respective flattened sides 270 and 272 to receive gripping wrenches or the like, for this purpose. Assuming that the initiator 10 is marketed without the fiber optic assembly 26 applied thereto, the initiator 10 is now ready for packaging and shipping.

After installation in the manner usual for initiator devices, the application of the conventional fiber optic cabling 26 in the manner already indicated, and the connection of the clevis assembly 240 to, for instance, an operating handle adjacent the vehicle pilot or other designated crewman, for use of the initiator 10, assuming that the keying pin 262 has been removed, the initiator 10 may then be actuated by manually pulling the clevis assembly 240 to the left of FIG. 1, which applies a thrust to the left of FIG. 1 on the actuator assembly 18, moving it to the left of FIG. 1 relative to the housing 12 and its header or end cap 14. This movement due to the camming action of the cam pin 194 in the slot 196 of collar 16, also rotates the actuator member 180 (counterclockwise of FIG. 2) to swing the swing arms 158 simultaneously away from the respective bulb stems 112 that they are to engage for bulb ignition purposes. Normally the actuator assembly is moved to the left of FIG. 1 for the full extent of travel permitted by the collar slot 196, and then released, permitting the resilient forces that have been built up in the respective swing arms 158 to resiliently return the actuator assembly in a clockwise direction so as to bring the respective lengths 160 of the swing arms 158 into striking engagement with the individual bulb stems 112 involved, thereby simultaneously igniting the bulbs 25.

As the bulbs 25 simultaneously ignite and burn from the left to the right of FIG. 1, in the flashing of the bulbs that is occurring, the high intensity light energy involved is passed through the tube 27 into the laser rod 24 in optical pumping relation to same whereby the laser beam is generated within the laser rod and is emitted at the end 134 thereof for application to the end 52 of the fiber optic member 54 that is part of the conventional fiber optic cabling 26 for activating the equipment that is to be activated by the initiator.

Figure 9:
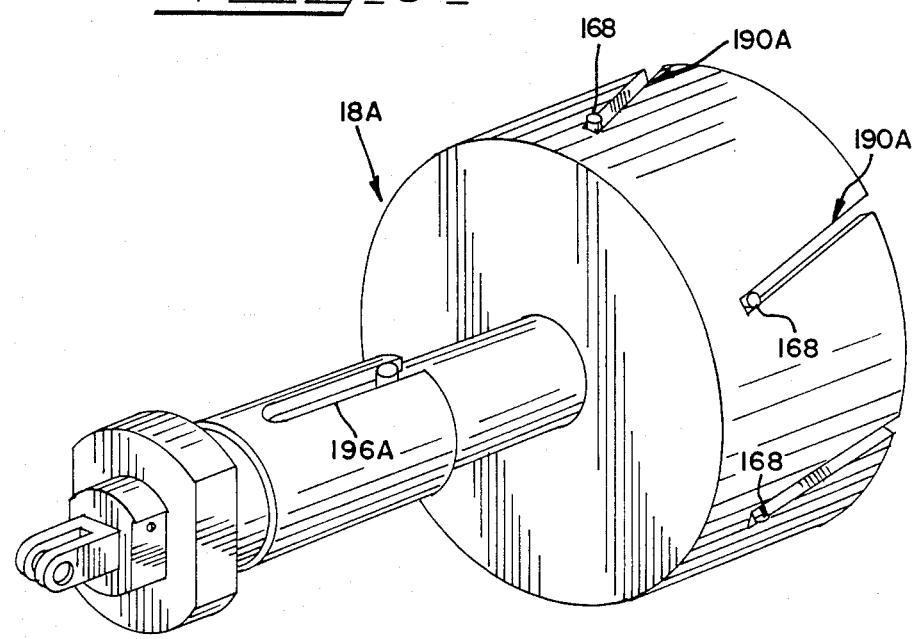
FIG. 9 is a view similar to that of FIG. 5, but illustrating an alternate form of the device.

In the modification of FIG. 9, it is the actuator assembly slots 190A, of the modified actuator 18A, that are arcuately disposed, while the collar slot 196A extends longitudinally of the longitudinal central axis of the unit. However, the wind up stroke on the swing arms 158 involved is the same due to the camming action of the respective slots 190A on their respective swing arm end portions 168 as the modified actuator assembly 18A is drawn to the left of FIG. 1 relative to the initiator housing 12 and associated parts. The modification represented by FIG. 9 is otherwise the same as the embodiment of FIGS. 1–8.

The covering of the laser rod 24 by tube 27 protects the laser rod 24 from damage during the ignition of the flash bulbs forming a part of a particular flash bulb assembly 22. The initiators of the present invention are therefore reusable by, after initiation use of a particular initiator 10, the initiator is removed and taken apart to the extent necessary to replace the flash bulb assembly 22 with a fresh flash bulb assembly having fresh flash bulbs 25 and tube 27, and then reassembled as indicated and reinstalled for the next initiation use.

The conventional flash bulbs are preferably of the elongate type and the commercially available units from either of the above identified commercial sources are approximately 2 inches in length are preferred, with the housing 12 and flash bulb assembly 22 being proportioned accordingly. The commercially available flash bulbs are dipped in vinyl which melts when the bulbs are ignited, and this is one of the reasons for latching tube 27 about laser rod 24 in protecting relation thereto. On replacement of the flash bulb assembly 22, a fresh tube 27 is applied to the initiator laser rod.

The reflective coatings 132 and 138 of the laser rod ends 130 and 136 may be formed from any suitable light reflective material, such as silver or mercury paste compounds, as is well known in the art. The laser rod 24 as disclosed is commercially available and from the indicated Schott Optical Glass Inc. source, the laser rod employed in a commercially successful embodiment of the invention was ⅜ths of an inch in diameter, with the tube 27, flash bulb assembly 22, and housing 12 being proportioned accordingly to achieve the close fitting relation indicated in FIGS. 1 and 3. The laser rod employed should have an optical pumping capacity lying in the known effective laser pumping range so that an acceptable uniform optical pumping in the laser rod can be achieved. Obviously, the light energy provided by the flash bulbs should be the minimum that will provide for adequate optical pumping in the laser rod, as is known in the art.

It will be apparent to those skilled in the art that the initiator housing through opening 23 may be adjustably shuttered as may be necessary or desirable.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A laser type initiator device for activating emergency equipment,
    said initiator device comprising:
    a housing having a generally cylindrical chamber and defining an aperture at one end of same and being open at the other end of same,
    said housing aperture defining a through opening and being open to said chamber,
    said housing chamber, through opening, and open end being coaxially related,
    a laser rod coaxially received in said chamber and having one end of same disposed adjacent said through opening and the other end disposed adjacent said housing open end,
    a tube of high strength transparent material received about said laser rod,
    a plurality of elongate flash bulbs of the percussion type mounted in said chamber about said tubes and having their primed ends disposed adjacent said housing open end,
    spring means for simultaneously striking the flash bulb primed ends to simultaneously ignite said flash bulbs,
    actuator means for stroking and release of said spring means for actuating same to strike and ignite said flash bulbs,
    and means for moving said actuator means for stroking said spring means when said device is to be actuated,
    with said laser rod having means for effecting optical pumping of the light energy released on said ignition of said flash bulbs for generation of the laser beam to be emitted by the initiator device.

2. The initiator device set forth in claim 1 wherein:
    said actuating means includes means for releasably locking same against actuation,
    and said moving means includes means for mechanically activating said actuating means when said actuating means is released for actuation.

3. The initiator device set forth in claim 2 wherein:
    said means for mechanically actuating said actuating means is manually operated.

4. The initiator device set forth in claim 1 wherein:
    said tube is formed from a high temperature resisting glass.

5. The initiator device set forth in claim 1 including:
    means for frictionally securing said rod against movement longitudinally thereof.

6. The initiator device set forth in claim 1 including:
    means for releasably connecting a fiber optic cable to said housing one end in alignment with said through opening.

7. The initiator device set forth in claim 1 wherein:
    said spring means comprises:
    a separate resilient swing arm for each of said bulbs,
    with the swing arm for and the primed end of each bulb being mounted for resilient striking of the respective swing arms against the respective primed ends of the respective bulbs,
    said actuator means including cam means for resiliently stressing the respective swing arms away from the primed ends of the respective bulb for spring biased impact against the respective primed ends of the respective bulbs on release of said actuator means.

8. A laser type initiator device for activating emergency equipment,
    said initiator device comprising:
    a housing having a generally cylindrical chamber and defining an aperture at one end of same and being open at the other end of same,
    said housing aperture defining a through opening and being open to said chamber,
    said housing chamber, through opening, and open end, being coaxially related,
    a laser rod coaxially received in said chamber and having one end of same disposed adjacent said through opening and the other end disposed adjacent said housing open end,
    a flash bulb assembly coaxially received in said chamber about said tube including means for closing said housing open end,
    said flash bulb assembly including a central tube of high strength transparent material received about said laser rod and a plurality of flash bulbs of the percussion type mounted in said flash bulb assembly about said tube and disposed to have their primed ends positioned in a plane that extends transversely of the longitudinal axis of said laser rod,
    a striking assembly mounted adjacent said plane,
    said striking assembly including a separate resilient swing arm for each of said primed ends of the respective bulb,
    said swing arms each acting in said plane,
    with the swing arm for and the primed end of each bulb being mounted for resilient striking of the respective swing arms against the respective bulb prime ends for igniting the respective bulb,
    a tubular actuator received over said striking assembly and mounted for limited movement longitudinally of said axis,
    said actuator including cam means for each of said swing arms for resiliently stressing the respective swing arms away from the respective primed ends of the respective bulbs in said plane on movement of said actuator in one direction longitudinally of said axis, for spring biased impact against the respective bulb primed ends on release of said actuator for movement in the opposite direction longitudinally of said axis under the spring bias generated in said swing arms by said resilient stressing of same to ignite said bulbs,
    means for actuating said actuator to effect said resilient stressing of the respective swing arms, and releasing said actuator to move under said spring bias for igniting said bulbs, means for actuating said actuator to effect said resilient stressing of the respective swing arms, and releasing said actuator to move under said spring bias for igniting said bulbs, with said laser rod having its other end disposed adjacent said striking assembly and fully light energy reflective longitudinally of said rod in the direction of its said one end, and having its said one end formed for light energy reflection longitudinally of said rod in the direction of its said other end that is on the order of 95 per cent reflective, whereby, on ignition of said bulb, light energy passing into said laser rod through said tube is optically pumped within said laser rod for laser beam supply from said laser rod said one end to and through said through opening.

9. The initiator device set forth in claim 8 wherein:
said cam means includes means for effecting rotational movement of said actuator about said axis when said actuator is moved longitudinally of said axis, for effecting said resilient stressing of the respective swing arms.

10. The initiator set forth in claim 9 including:
a clevis device for effecting said movement of said actuator longitudinally of said axis and connected thereto for accommodating said rotational movement of said actuator.

11. The initiator device set forth in claim 8 wherein:
said cam means includes means for effecting said resilient stressing of the respective swing arms on non-rotational movement of said actuator longitudinally of said axis.

12. The initiator set forth in claim 8 wherein:
said actuator includes means for releasably keying same with respect to said housing,
and means for manually actuating said actuator when said actuator is released for actuation.

13. The initiator set forth in claim 8 including:
means for frictionally securing said laser rod against movement longitudinally thereof with respect to said housing.

14. The initiator set forth in claim 8 including:
means for releasably connecting a fiber optic cable to said housing one end in alignment with said through opening.

* * * * *